(12) United States Patent
Desprez

(10) Patent No.: US 6,595,543 B2
(45) Date of Patent: Jul. 22, 2003

(54) MOTOR VEHICLE EQUIPMENT FOR AIRBAG, CORRESPONDING ASSEMBLY AND METHOD FOR MANUFACTURING IT

(75) Inventor: Daniel Desprez, Courrieres (FR)

(73) Assignee: Faurecia Industries, Boulogne Billancourt (FR)

( * ) Notice: Subject to any disclaimer, the term of this patent is extended or adjusted under 35 U.S.C. 154(b) by 0 days.

(21) Appl. No.: 09/906,840

(22) Filed: Jul. 18, 2001

(65) Prior Publication Data

US 2002/0014759 A1 Feb. 7, 2002

(30) Foreign Application Priority Data

Jul. 18, 2000 (FR) .............................................. 00 09428

(51) Int. Cl.$^7$ .............................................. B60R 21/16
(52) U.S. Cl. .................................. 280/728.3; 280/728.2
(58) Field of Search ....................... 280/728.1, 728.3, 280/728.2, 731, 733, 743.2

(56) References Cited

U.S. PATENT DOCUMENTS

| 5,069,477 | A | * | 12/1991 | Shiraki ..................... 280/728.3 |
| 5,096,220 | A | | 3/1992 | Nakajima |
| 5,203,586 | A | * | 4/1993 | Niwa et al. .............. 280/728.3 |
| 5,335,939 | A | * | 8/1994 | Kuriyama et al. ........ 280/728.3 |
| 5,427,408 | A | * | 6/1995 | Ando et al. .................. 264/275 |
| 5,433,473 | A | * | 7/1995 | Hiramitsu et al. ........ 280/728.3 |
| 5,449,196 | A | * | 9/1995 | Ohno et al. .............. 280/728.3 |
| 5,639,115 | A | | 6/1997 | Kelley et al. |
| 5,941,557 | A | * | 8/1999 | Mullins et al. .......... 280/728.3 |
| 5,975,563 | A | * | 11/1999 | Gallagher et al. ........ 280/728.2 |

FOREIGN PATENT DOCUMENTS

| EP | 715992 | 6/1996 |
| EP | 947 396 | 10/1999 |
| EP | 970 856 | 1/2000 |
| WO | 96 30232 | 10/1996 |

* cited by examiner

Primary Examiner—Paul N. Dickson
Assistant Examiner—Toan C To
(74) Attorney, Agent, or Firm—Sughrue Mion, PLLC

(57) ABSTRACT

This motor vehicle equipment comprises a fascia (4) delimiting an opening (14) covered with a facing (16), and an airbag support (6) comprising a flange (22). The support (6) comprises a fixing plate (30) connected to the flange (22) by a hinge (32), the flange being fixed to the fascia (4) and the fixing plate being fixed to the facing (16). A reinforcing net (40) is arranged between the flange (22) and the fascia (4) and between the plate (30) and the facing (16). The net (40) extends across the region of the hinge (32). The flange (22) and the fascia (4), and the fixing plate (30) and the facing (16), are fixed together through the meshes of the net (40).

19 Claims, 2 Drawing Sheets

MOTOR VEHICLE EQUIPMENT FOR AIRBAG, CORRESPONDING ASSEMBLY AND METHOD FOR MANUFACTURING IT

The invention relates to motor vehicle equipment of the type comprising:

a fascia of plastic material delimiting a deployment opening for an airbag covered with a facing when the airbag is in the uninflated state;

an airbag support made of plastic arranged against the back surface of the fascia, this support comprising a fixing flange which extends over at least part of the periphery of the deployment opening, the support further comprising a plate for fixing the facing to the support, connected to the flange by a main hinge, the flange being fixed to the fascia and the fixing plate being fixed to the facing at least in the region adjacent to the main hinge.

BACKGROUND OF THE INVENTION

The invention applies in particular to motor vehicle dashboards.

The prior art knows motor vehicle equipment of the aforementioned type, particularly dashboards.

These dashboards have the disadvantage that the material of the airbag module support needs to satisfy several contradictory conditions, namely:

it needs to be flexible in the region of the hinge;

it needs to be rigid in the region carrying the airbag module;

it needs to be compatible, from the fixing (bonding/welding) point of view with the material of which the dashboard fascia is made.

When one single plastic is being used for the airbag support, it is not possible to guarantee that the hinge will not break when the airbag is set off, particularly at low temperature.

SUMMARY OF THE INVENTION

It is an object of the invention to provide motor vehicle equipment, particularly a dashboard, which is easy to manufacture and which comprises a facing articulation that is reliable when the airbag is set off.

To this end, the subject of the invention is equipment of the aforementioned type, characterized in that a reinforcing net is arranged between the flange and the fascia, and between the plate and the facing, this net extending across the hinge region, and in that, on the one hand, the flange and the fascia and, on the other hand, the fixing plate and the facing, are fixed together through the meshes of the net.

According to some particular embodiments, the invention may have one or more of the following features:

the fascia and the facing are manufactured as a single piece, and the facing is delimited by a preferred line of breakage particularly formed in the back surface of the fascia;

the net has greater low-temperature flexibility than the hinge;

the net has a melting point higher than the melting point of the fascia and of the facing;

the net is made of metal;

the net is made of plastic, particularly of polypropylene, of polyethylene or polyamide;

the support is fixed to the fascia and to the facing by welding;

the net and the fixing plate extend over roughly the entire area of the facing and the fixing plate is fixed to the facing over roughly this entire area;

the distance between the locations of the welds is roughly equal to the mesh size of the net;

the fascia has positioning pegs, particularly formed integrally with it, which collaborate with the meshes of the net and with position recesses formed in the flange and in the fixing plate;

the support is manufactured as a single piece; and the equipment constitutes at least part of a dashboard.

A further subject of the invention is an assembly comprising equipment as defined hereinabove and an airbag module, characterized in that the net has a free part fixed to the airbag support by a means of fixing the airbag module to this support.

A further subject of the invention is a method for manufacturing equipment as defined hereinabove, characterized in that it comprises the following steps:

the fascia, the facing and the support are manufactured, particularly by injection-molding of plastics;

the reinforcing net is placed on the facing and the region of the fascia corresponding to the flange; and the flange is fixed to the fascia and the plate is fixed to the facing through the meshes of the net.

According to some particular embodiments, the method further comprises the following steps:

the fascia and the facing are placed in a welding device;

the flange is welded against the fascia and the plate is welded against the facing through the meshes of the net; and the equipment is removed from the welding device; and said welding is performed by vibration welding.

BRIEF DESCRIPTION OF THE DRAWINGS

The invention will be better understood upon reading the description which will follow, which is given merely by way of example and made with reference to the appended drawings, in which.

DETAILED DESCRIPTION OF THE INVENTION

Figure 1:
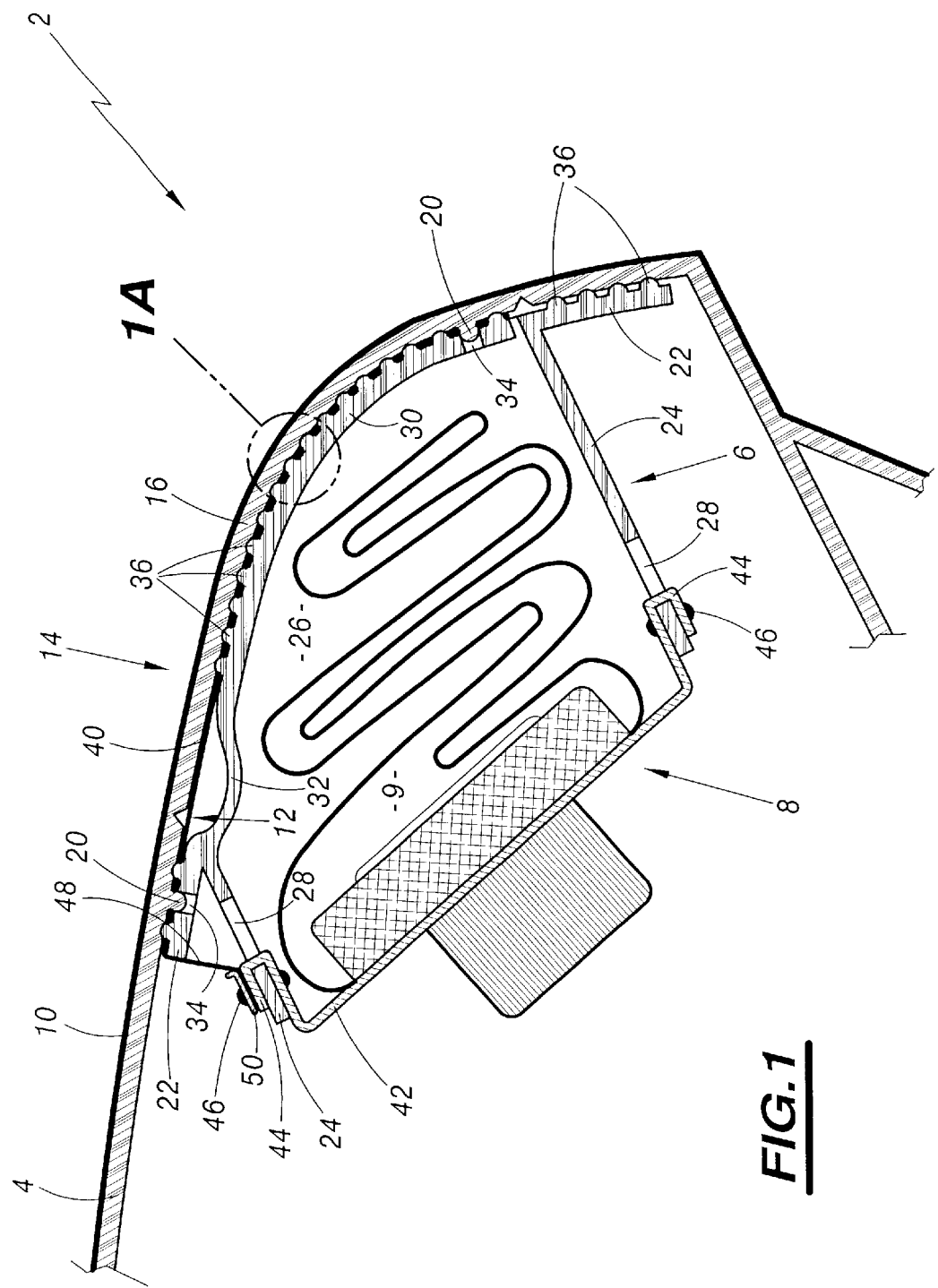
FIG. 1 depicts a cross section through a dashboard according to the invention.

FIG. 1 depicts a dashboard assembly according to the invention and denoted by the general reference 2.

In what follows, the term "front" will refer to the visible part of the dashboard in the mounted state, while the term "back" will denote the non-visible part thereof.

The dashboard assembly essentially comprises a dashboard fascia 4, an airbag module support 6 fixed to the back surface thereof, and an airbag module 8 equipped with an airbag 9.

The dashboard fascia 4 consists of stiffened thermoplastic, for example polypropylene or polyethylene with a talc content of between 10% and 20%. The fascia 4 is covered with a decorative skin 10 on its visible surface.

The dashboard fascia 4 has a preferred line of breakage 12 formed on the back surface of the fascia 4 and delimiting an opening 14 for the deployment of the airbag 9, this opening being covered by a facing 16 when the airbag 9 is in the uninflated state. The facing 16 is made of a single piece with the fascia 4. As a variation, the facing may be an attached part.

Positioning pegs 20 formed integrally by molding with the fascia 4 project from the back surface of the fascia.

The support 6 is manufactured as a single piece, of thermoplastic with a high elasticity by comparison with the dashboard fascia 4, for example of polypropylene containing an elastomer additive. Such materials are, for example, Vistaflex® or Téfabloc®.

The support 6 has a flange 22 for fixing the support to the fascia 4 resting against the back surface of the fascia 4 and surrounding the preferred line of breakage 12. Walls 24 project from the flange 22 backward and form a housing 26 accommodating the airbag module 8.

Mounting openings 28 are formed in the lower part of the walls 24. The support 6 further comprises a plate 30 which is fixed to the back surface of the facing 16 and which extends over roughly the entire area thereof. The plate 30 is connected by a film hinge 32 to the upper edge of the flange 22. The hinge 32 straddles the upper part of the preferred line of breakage 12. In the unfixed state, the support 6 is positioned by positioning holes 34 made in the flange 22 and in the plate 30. The pegs 20 plug into these holes.

Figure 1A:
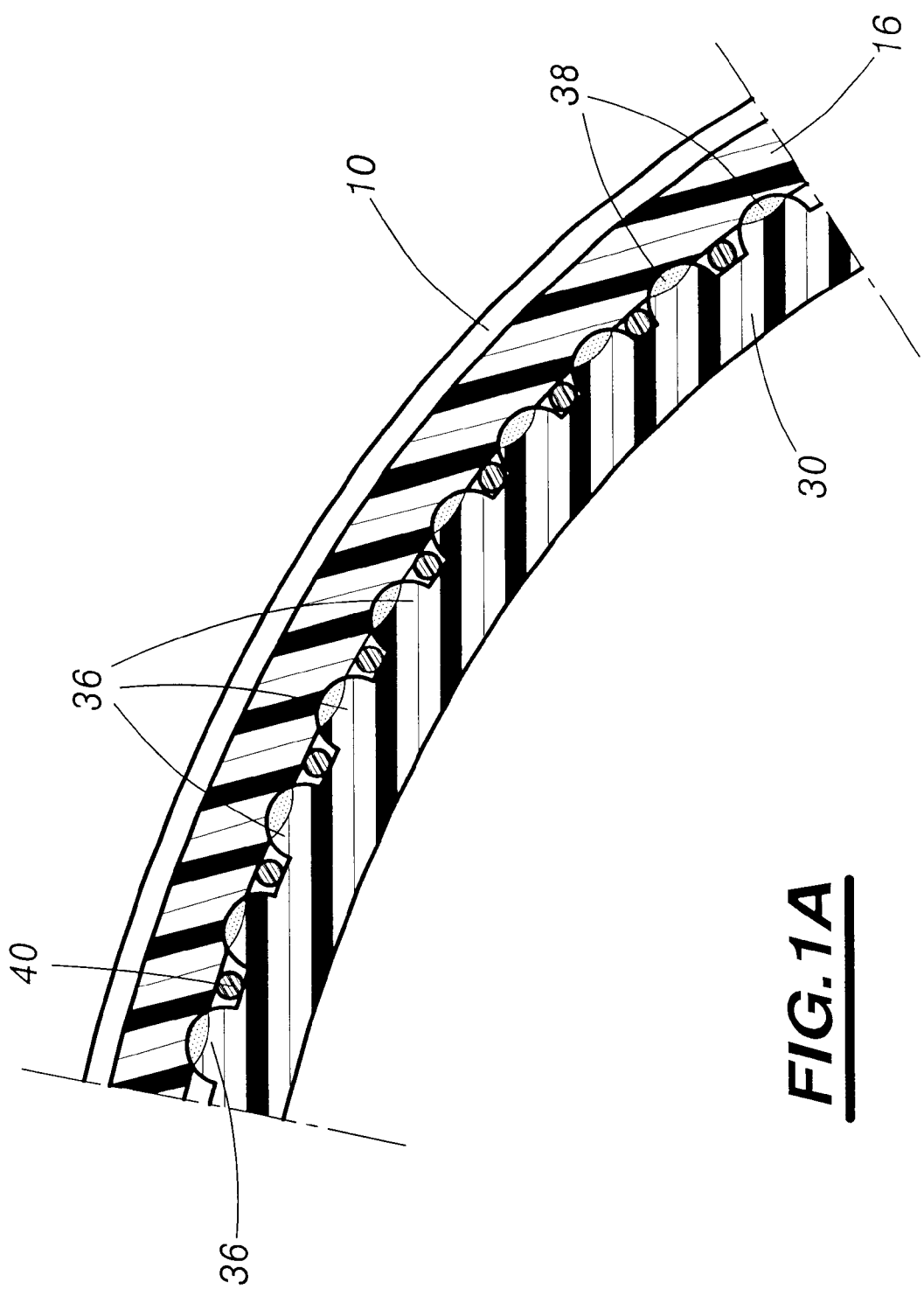
FIG. 1A depicts detail 1A of FIG. 1 on a larger scale.

The flange 22 and the plate 30 further comprise welding ribs 36 on their side facing toward the fascia 4, the ribs 36 of the plate 30 being represented in greater detail in FIG. 1A. The ribs 36 run roughly parallel to one another and at right angles to the plane of FIG. 1A.

The top 38 of each rib is welded to the interior surface of the fascia 4 or of the facing 16.

A reinforcing net 40 is arranged between the support 6 and the fascia 4, and extends from the upper part of the flange 22 across the entire back surface of the facing 16, crossing the region of the film hinge 32.

The net 40 is made of a plastic with a melting point higher than the temperature at which the support 6, the fascia 4 and the facing 16 are welded. The net 40 may, for example, be made of polypropylene, polyethylene or polyamide. As an alternative, the net 40 may be made of metal. Note that the net 40 has greater low-temperature flexibility than the film hinge 32.

The height of the net 40 is substantially less than the height of the welding ribs 36, so as not to prevent good securing upon welding.

Note that the distance between the ribs 36 is preferably roughly equal to the mesh size of the net 40. Thus, a large welding area for welding the two components together is obtained.

The airbag module 8 comprises a support plate 42 equipped with parts forming hooks 44. These hooks 44 hook into the mounting openings 28 and are fixed to the walls 24 of the support 6 by rivets 46. Incidentally, the airbag module 8 is of a known type and is not described further in detail.

A free part 48 of the net 40 projects beyond the upper part of the flange 22 and is fixed to the upper part of the wall 24 of the housing 26. This part 48 of the net 40 is trapped between a fixing strip 50 and the upper hook 44 by the rivet 46 that fixes the airbag module to the housing 26.

The dashboard assembly according to the invention is assembled as follows.

The dashboard fascia 4, the net 40, the airbag module support 6 and the airbag module 8 are prefabricated.

First of all, the dashboard fascia 4 is placed in a holding device of a vibration-welding machine.

The net 40 is then applied to the back side of the dashboard fascia 4, the net 40 being held in position by the positioning pegs 20.

Next, the airbag module support 6 is applied to the back surface of the fascia 4 covered with the net 40. The support 6 is also positioned by the pegs 20.

The free part 48 of the net projects from the support. Next, the support 6 is welded, through the meshes of the net 40, against the fascia 4 and the facing 16.

The assembly is then removed from the welding machine and the airbag module 8 is put in place, the end of the free part 48 of the net 40 is applied against the exterior surface of the hook 44, and the clamping strip 50 is placed over this end of the net.

Finally, the module 8, the strip 50 and the end of the free part 48 of the net are riveted in a single operation.

The dashboard works as follows:

When the airbag 9 is triggered, it inflates and pushes against the interior surface of the plate 30 until the preferred line of breakage 12 breaks. From that moment on, the facing 16 and the plate 30 pivot upward as one piece.

Should the film hinge 32 break, for example at low temperature, the facing 16 and the plate 30 are held together by the net 40.

The tensile forces exerted by the facing 16 and/or the plate 30 are absorbed partly by the clamped end of the free part of the net 40.

Note that even if cracks appear in the facing 16 or in the plate 30, the probability of small fragments of these two items being released is greatly diminished by virtue of the facing 16 and the plate 30 being held together via the net 40.

It is noted that the arranging of a net 40 sandwiched between the support 6, the fascia 4 and the facing 16 makes it possible, in a simple and economical way, to improve the reliability of the articulation between the facing 16 on the fascia 4.

In addition, a greater freedom can be had in the choice of materials for the support 6, the fascia 4 and the facing 16.

Note that other techniques for fixing the support to the fascia and to the facing may be employed, for example bonding or other methods of welding.

What is claimed is:

1. Motor vehicle equipment comprising:
    a fascia (4) of plastic material delimiting a deployment opening (14) for an airbag (9), wherein the opening is covered with a facing (16) when the airbag (9) is in an uninflated state;
    an airbag support (6) made of plastic arranged against the back surface of the fascia (4), this support (6) comprising a fixing flange (22) which extends over at least part of the periphery of the deployment opening (14),
    the support (6) further comprising a fixing plate (30) for fixing the facing to the support, said plate being connected to the flange (22) by a main hinge (32), the flange being fixed to the fascia (4) and the fixing plate (30) being fixed to the facing (16) at least in a region adjacent to the main hinge (32),
    characterized in that a reinforcing net (40), having meshes, is arranged between the flange (22) and the fascia (4), and between the plate (30) and the facing (16), said net (40) extending across the hinge region (32),
    in that the flange (22) and the fascia (4) are fixed together through the meshes of the net (40), in that the fixing plate (30) and the facing (16) also are fixed together through the meshes of the net (40), in that the fascia (4) and the facing (16) form a first premanufactured subassembly, and the airbag support (6) forms a second premanufactured subassembly distinct from the first subassembly, in that the fixing flange (22) and the fixing plate (30) have respective welding protrusions (36), and in that a top (38) of each welding protrusion (36) of the fixing flange (22) is fixed to an interior surface of the fascia (4) by welds, and the top (38) of each welding protrusion (36) of the fixing plate (30) is fixed to an interior surface of the facing (16) by welds.

2. Equipment according to claim 1, characterized in that the fascia (4) and the facing (16) are manufactured as a single piece, and in that the facing (16) is delimited by a preferred line of breakage (12) particularly formed in the back surface of the fascia (4).

3. Equipment according to claim 1, characterized in that the net (40) has greater flexibility than the hinge (32).

4. Equipment according to claim 1, characterized in that the net (40) has a melting point higher than the melting point of the fascia (4) and of the facing (16).

5. Equipment according to claim 4, characterized in that the net (40) is made of metal.

6. Equipment according to claim 4, characterized in that the net (40) is made of plastic, particularly of polypropylene, of polyethylene or polyamide.

7. Equipment according to claim 4, characterized in that the support (6) is fixed to the fascia (4) and to the facing (16) by welds.

8. Equipment according to claim 7, characterized in that the welds (38) are spaced apart by a distance which is substantially equal to the mesh size of the net (40).

9. Method for manufacturing equipment according to claim 4, characterized in that said method comprises the following steps:

first manufacturing the fascia (4), the facing (16) and the support (6) are by injection-molding of plastics to form said first and second premanufactured subassemblies, respectively;

then placing the reinforcing net (40) on the facing (16) and a region of the fascia (4) corresponding to the flange (22); and fixing the flange (22) to the fascia (4), and the plate (30) to the facing (16), through the meshes of the net (40).

10. Method according to claim 9, for manufacturing equipment, characterized in that said method further comprises the following steps:

placing the fascia (4) and the facing (16) in a welding device;

welding the flange (22) against the fascia (4), and the plate (30) against the facing (16), through the meshes of the net (40); and removing the equipment from the welding device.

11. Manufacturing method according to claim 10, characterized in that said welding is performed by vibration welding.

12. Equipment according to claim 1, characterized in that the net (40) and the fixing plate (30) extend over a majority of the entire area of the facing (16) and in that the fixing plate (30) is fixed to the facing (16) over a majority of this entire area.

13. Equipment according to claim 1, characterized in that the fascia (4) has positioning pegs (20) which collaborate with the meshes of the net (40) and with position recesses (34) formed in the flange (32) and in the fixing plate (30).

14. Equipment according to claim 1, characterized in that the support (6) is manufactured as a single piece.

15. Equipment according to claim 1, characterized in that said equipment constitutes at least part of a dashboard.

16. Assembly comprising equipment according to claim 1 and an airbag module (8), characterized in that the net (40) has a free part (48) fixed to the airbag support (6).

17. Equipment according to claim 1, wherein the hinge (32) extends at a distance from the facing (16).

18. Equipment according to claim 1, wherein there is a free space between the hinge (32) and the facing (16).

19. Motor vehicle equipment comprising:

a fascia (4) of plastic material delimiting a deployment opening (14) for an airbag (9), wherein the opening is covered with a facing (16) when the airbag (9) is in an uninflated state;

an airbag support (6) made of plastic arranged against the back surface of the fascia (4), this support (6) comprising a fixing flange (22) which extends over at least part of the periphery of the deployment opening (14), the support (6) further comprising a fixing plate (30) for fixing the facing to the support said plate being connected to the flange (22) by a main hinge (32), the flange being fixed to the fascia (4) and the fixing plate (30) being fixed to the facing (16) at least in a region adjacent to the main hinge (32), characterized in that a reinforcing net (40), having meshes, is arranged between the flange (22) and the fascia (4), and between the plate (30) and the facing (16), said net (40) extending across the hinge region (32), in that the flange (22) and the fascia (4) are fixed together through the meshes of the net, (40), in that the fixing plate (30) and the facing (16) also are fixed together through the meshes of the net (40), and in that the fascia (4) and the facing (16) form a first premanufactured subassembly, and the airbag support (6) forms a second premanufactured subassembly distinct from the first subassembly.

* * * * *